United States Patent [19]
Piedl et al.

[11] Patent Number: 6,084,376
[45] Date of Patent: Jul. 4, 2000

[54] LOW COST RESOLVER SYSTEM

[75] Inventors: Martin Piedl, Blacksburg; Moe Barani, Radford; Ron Flanary, Blacksburg, all of Va.

[73] Assignee: Aspen Motion Technologies, Inc., Radford, Va.

[21] Appl. No.: 09/093,720

[22] Filed: Jun. 9, 1998

[51] Int. Cl.[7] ........................................... H02P 6/16
[52] U.S. Cl. ........................ 318/605; 318/254; 318/439; 318/661
[58] Field of Search ..................... 318/600, 604, 318/605, 661, 138, 254, 439

[56] References Cited

U.S. PATENT DOCUMENTS

| | | | |
|---|---|---|---|
| 4,270,077 | 5/1981 | Swartz et al. | 318/661 |
| 4,551,708 | 11/1985 | Welburn | 340/347 SY |
| 4,631,510 | 12/1986 | Nagarkatti et al. | 310/168 X |
| 4,843,291 | 6/1989 | Predina | 318/605 |
| 4,890,047 | 12/1989 | Maney | 318/661 |
| 4,922,175 | 5/1990 | Sugiura et al. | 318/592 |
| 4,933,674 | 6/1990 | Gasperi et al. | 341/116 |
| 4,989,001 | 1/1991 | Serev | 341/116 |
| 5,134,397 | 7/1992 | Eyerly et al. | 341/116 |
| 5,155,696 | 10/1992 | Shibata et al. | 364/571.01 |
| 5,189,353 | 2/1993 | Ezuka | 318/605 |
| 5,241,268 | 8/1993 | Lee | 324/207.25 |
| 5,250,889 | 10/1993 | Ezuka | 318/661 |
| 5,646,496 | 7/1997 | Woodland et al. | 318/632 |
| 5,912,638 | 6/1999 | Vlahu | 341/116 |
| 5,949,359 | 9/1999 | Vlahu | 341/116 |

FOREIGN PATENT DOCUMENTS 10111145  4/1998  Japan .

*Primary Examiner*—Bentsu Ro
*Attorney, Agent, or Firm*—Quarles & Brady LLP

[57] ABSTRACT

A resolver (10) is excited with a high frequency signal from excitation circuit (16). Outputs of the resolver (10) are transmitted through receiver circuit (24) and input to a DSP signal processing circuit (18), which demodulates the sine and cosine outputs to provide samples of the sine and cosine of the rotor position. The sample values are converted to digital values, which are used to calculate a shaft angular position, which is then used for closed loop position and velocity control of a brushless PM motor (14).

10 Claims, 4 Drawing Sheets

LOW COST RESOLVER SYSTEM

FIELD OF THE INVENTION

This invention relates to a low cost system for accurately determining the angular position of a motor shaft, and more particularly to a low cost digital signal processing system for use in combination with a low cost resolver to generate an output with sufficient accuracy and resolution to provide sine wave commutation and/or closed loop motor velocity and position control.

DESCRIPTION OF THE PRIOR ART

Today, low cost commutation feedback for a brushless permanent magnet motor drive system uses Hall effect sensors for determining rotor position and stepping motor commutation in response to a state transition in the Hall effect switches. This technique, known as six-step switching, is very commonly used for high volume brushless permanent magnet motor applications. However, the six-step switching technique fails to provide optimal motor control. Its shortcomings include:

1) The stepping technique results in a torque variation (about 15% peak-to-peak/Ave) which is most noticeable at low speeds (100 RPM and below). This is often undesirable for a particular application and forces the user to use a more expensive means of control, such as a resolver/sine wave commutation system. By commutating with a sine wave rather than a six-step scheme, the torque variation of 15% that is associated with the six-step technique is decreased to about 3%.

2) The actual position of the rotor is known only at the time of a Hall effect transition. All other times the position is only an estimate. Because of this, the information generated by the Hall effect sensors is usually inadequate for closing a position loop on a system. If a position loop is needed, customers tend to add an optical encoder onto the motor shaft and use its information to close the position loop. Likewise, the Hall effect signals do not provide enough information for smooth velocity control at low speeds forcing the use of an encoder or similar type device if smooth velocity is required.

3) Algorithms, like field orientation control, which can dramatically improve system efficiency/cost, cannot be accurately implemented throughout the entire speed range without knowing the actual position of the rotor. This results in a non-optimal motor performance.

4) Six-step switching requires Hall effect sensors to be integrated into the motor. Hall effect sensors are electronic components and have a decreased life expectancy as the temperature increases. Resolvers consist of only copper and iron (no electronic components) and will have a longer life expectancy for an elevated temperature than Hall effect devices. In addition the resolver, again constructed of only copper and iron, is a much more rugged (particularly from a shock and vibration standpoint) device than a Hall effect assembly which consists of Hall effect devices mounted onto a printed circuit board.

The majority of applications that use resolvers are very high end applications such as machine tools, industrial automation, military, etc. Their resolvers typically consist of a wound stator with three windings (a primary, and two output windings, sine and cosine) and a rotor with a single winding which acts as a rotary transformer. The cost of a resolver becomes more significant as the size of the motor decreases and/or the market becomes price sensitive. Therefore, another type of resolver has been investigated, called a variable reluctance resolver, which does not have a rotor winding. Reluctance resolvers are easier to manufacture than conventional resolvers, but are not as accurate as a conventional resolver. The winding on the rotor is eliminated, which significantly simplifies construction and decreases the overall cost of the resolver. A reluctance resolver typically has a laminated or solid rotor with a specific geometry to match the stator windings. The stator of a reluctance resolver is similar but less complex than a conventional resolver. The stator has a primary input and two outputs (sine and cosine) just like a conventional resolver. However, this type of resolver has not been widely commercially accepted because it requires costly resolver-to-digital converters to interpret the output of the resolver. In addition, the resolver-to-digital converter requires the resolver output to be very sinusoidal. Any deviations of the resolver output from a sinusoidal waveform will result in erroneous interpretation of the resolver's position. Therefore, the variable reluctance resolver must produce a truly 100% sinusoidal waveform which restricts the number of variable reluctance resolvers and manufacturing techniques applicable for use with a resolver-to-digital converter chip.

Regardless of the type of resolver used, a resolver-to-digital converter is typically used to decode the resolver into a usable digital format. The cost of a converter is, like the conventional resolver, very significant in volume applications.

SUMMARY OF THE INVENTION

An object of this invention is the provision of a low cost resolver system with significant accuracy and resolution to provide sine wave commutation signals for a brushless, permanent magnet motor. The objects of the invention also include the ability to use the system to generate closed loop motor position and/or velocity control of both brushless motors and motors which use commutating brushes.

Briefly, this invention details the provision of a system in which a resolver is excited with a high frequency, periodic signal and the sine and cosine resolver outputs are coupled as an input to a processor, preferably to a commercially available motion control digital signal processor (henceforth referred to as "processor"). The processor demodulates the sine and cosine outputs to provide samples of the sine and cosine of the rotor position. The sample values are converted to digital values which are used to calculate the shaft angular position. The calculations may incorporate correction factors to compensate for distortions and inaccuracies.

BRIEF DESCRIPTION OF THE DRAWINGS

The foregoing and other objects, aspects and advantages will be better understood from the following detailed description of a preferred embodiment of the invention, in which.

DETAILED DESCRIPTION OF THE PREFERRED EMBODIMENTS

Figure 1:
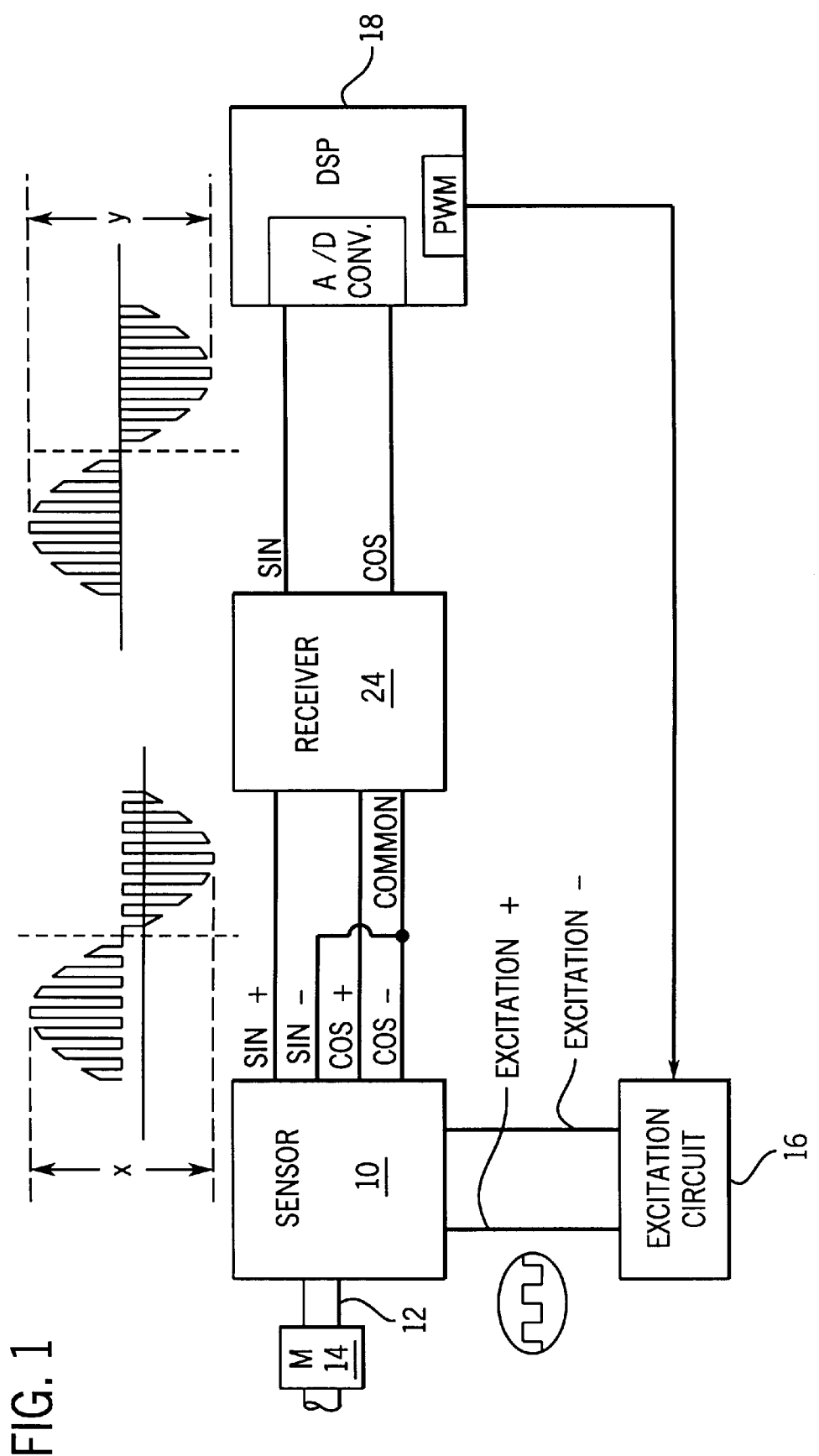
FIG. 1 is a functional block diagram of one embodiment of a shaft position sensing system in accordance with the teachings of this invention.

Referring now to FIG. 1, a shaft angular position sensor 10 is attached to the shaft 12 of a motor 14. Although not limited thereto, in a specific embodiment motor 14 is a brushless, permanent magnet motor. The sensor 10 is a resolver with cosine and sine outputs. In a preferred embodiment of the invention, a low cost, variable reluctance resolve is used, such as, the resolver disclosed in U.S. Pat. No. 4,631,510. Here it will be appreciated that there has been a trade off in the prior art systems between the cost of the system and accuracy and resolution to which the shaft position can be determined, and that the system of this invention provides high accuracy and resolution at low cost.

The stator coils of the resolver 10 are excited by a pulse train output from a coil excitation driver circuit 16 whose input is coupled to an output of a processor 18. The processor 18 is preferably a commercially available digital signal processor (DSP) typically used for motion and speed control applications, such as the DSPs available from Texas Instruments and Analog Devices. Such DSPs include integral analog-to-digital input converters and digital outputs that can be pulses width modulated. Alternatively to the use of a DSP, a microprocessor or other logic circuits programmed to perform the functions herein described can be used as processor 18.

The pulse output of the processor 18 in this application is constant frequency, constant pulse width. The function of this output is to maintain and insure synchronization between the resolver coil excitation and the points at which the outputs of the resolver are sampled. With a square wave pulse excitation, as shown in this exemplary embodiment of the invention, the resolver outputs are square waves amplitude modulated by the sine and cosine functions of the shaft angular position. These sine/cosine modulated outputs of the resolver are coupled as inputs to the processor 18 which, as part of the analog-to-digital conversion process, samples the value of the inputs synchronously with the coil excitation and the peak of each pulse. These sample values, which are converted to digital values for processing, thus provide the values of the modulated envelope of the resolver outputs, i.e. the sine and cosine values. Here it will be appreciated that this simplifies the analog-to-digital conversion process. The sample rate can be at the same rate as the coil excitation frequency, which preferably is relatively low, (for example, about 20 kHz), without loss of sine or cosine data. While square wave excitation is used in this illustrative embodiment, other pulse wave forms may be used to excite the resolver stator coils, for example, a pulse stream with a trapezoidal wave form.

A receiver 24 scales and level shifts the resolver outputs, if necessary, to provide a signal properly interfaced to the input of processor 18.

Figure 2:
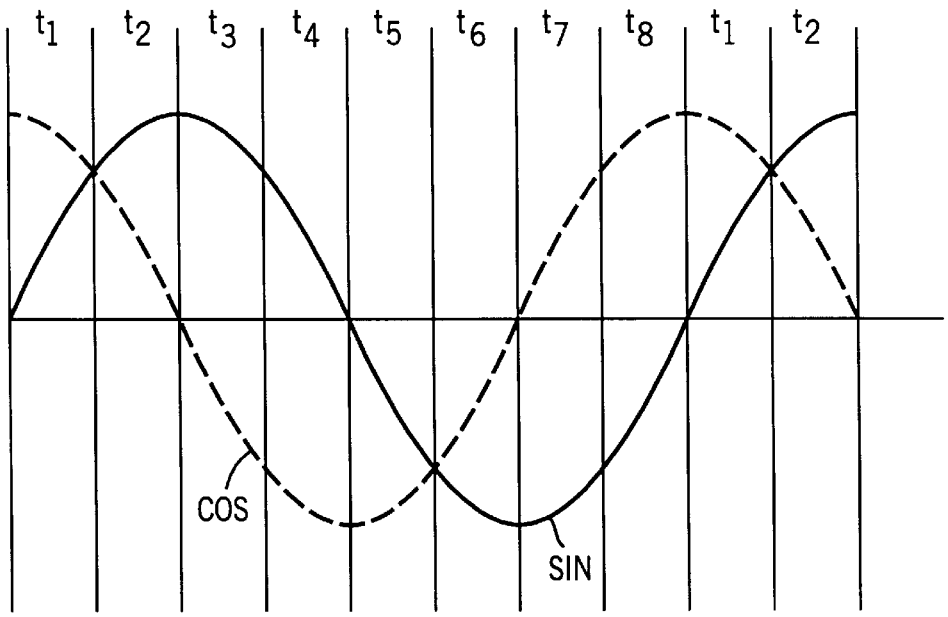
FIG. 2 is a diagram illustrating the sine and cosine resolver outputs as a function of shaft position and the division of each cycle into eight sectors.
Figure 3:
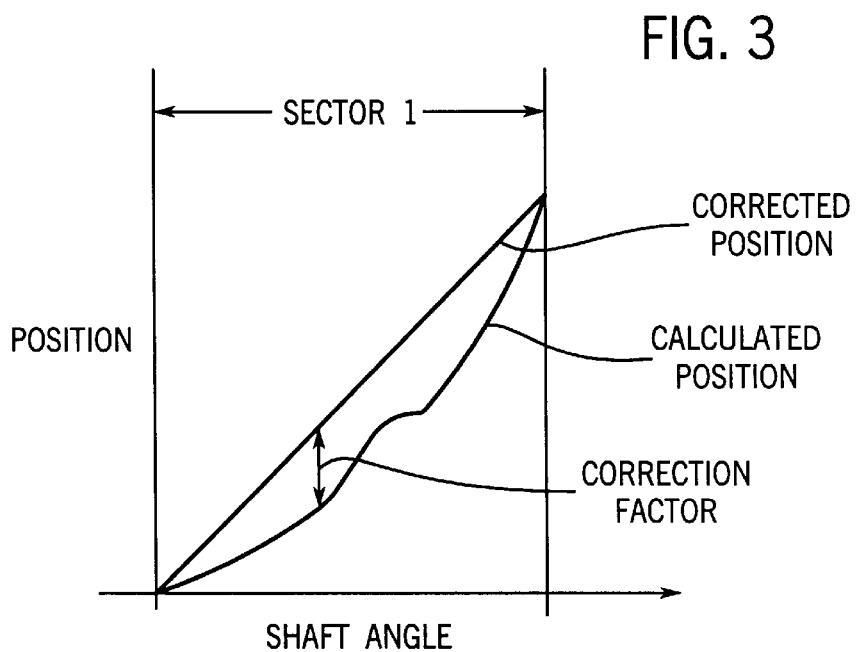
FIG. 3 is a diagram illustrating the amplitude of the demodulated correction factor, showing a shaft position calculated on the basis of the resolver outputs and a corrected position which is the actual position.

Referring now to FIGS. 2 and 3, the processor 18 is programmed to convert the digitized sine and cosine values to a shaft angular position value using a suitable prior art resolver algorithm. In a specific embodiment of the invention, the processor 18 is programmed to divide each 360 degree shaft revolution into eight 45-degree sectors as illustrated in FIG. 2. Based on the values and/or state of the cosine and sine functions relative to one another, the processor 18 determines in which one of the eight sectors the reference point of the shaft lies. Then, based on these sine and cosine values, it calculates an angular position of the reference within the sectors. To correct for inaccuracies and distortions associated with the resolver outputs, a decoding correction factor (illustrated in FIG. 3) is applied to the calculated shaft angular position. The processor 18 uses the estimated shaft correction factor within a segment to address and to fetch a correction factor from a look-up table. The angular position of the sector is added to the calculated shaft angular position within a sector in order to obtain the corrected shaft angular position.

These correction factors (illustrated in FIG. 3), may be determined empirically by comparing the calculated angular position with the measured position for each resolver, or a class of resolvers, and storing the corrected factors. The correction factor may be addressed by the estimated angular position level and the sector. The corrected value of the shaft angular position within a sector and the sector number are used to determine the shaft angular position "A" within a 360-degree revolution.

Figure 4:
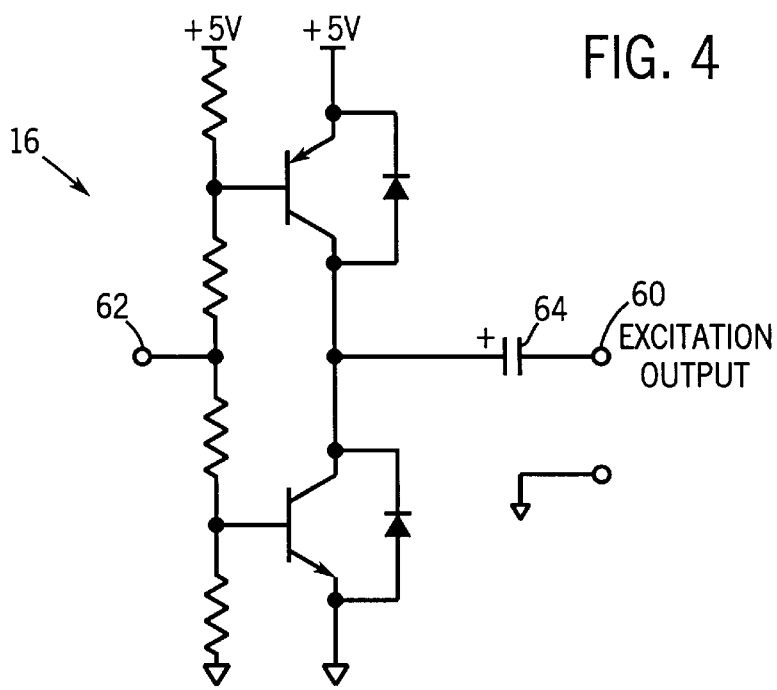
FIG. 4 is a schematic diagram of an exemplary driver circuit for exciting the resolver in the system shown in FIG. 1.
Figure 5:
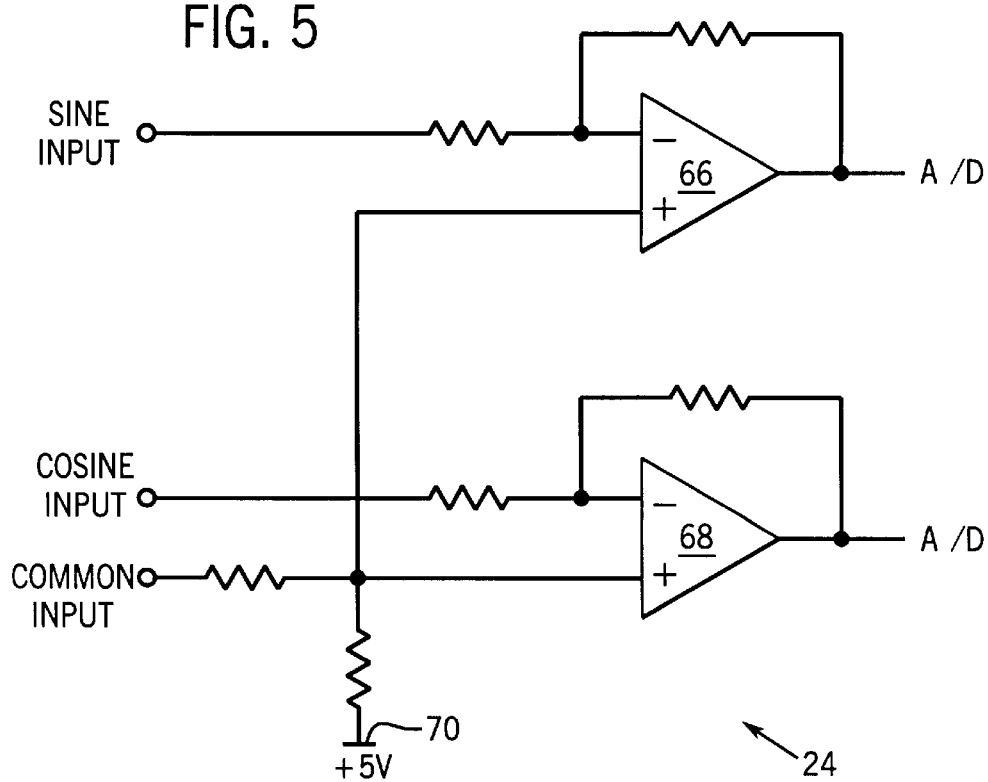
FIG. 5 is a schematic diagram of an exemplary circuit for level shifting and scaling the input to the processor.

FIG. 4 shows one specific embodiment of the excitation circuit 16, here shown as a discrete component embodiment, although it will be appreciated that the circuit 16 could be implemented as a single integrated circuit. The NPN, PNP transistor pair alternatively couple an output 60 to plus V (e.g. +5 volts) and ground depending on the state of a square wave input 62. A capacitor 64 blocks any d.c. voltage from the output 60, and the diodes across the transistors provide a current path for current flow as the input changes. FIG. 5 shows one specific example of a receiver circuit using two operational amplifiers 66 and 68 with a common reference 70 for scaling the peak-to-peak value of the resolver sine and cosine outputs to a desired value to input to the processor 18 and for providing a voltage offset to accommodate the unipolar inputs of the processor of the sine and cosine values changes at zero volts.

Figure 6:
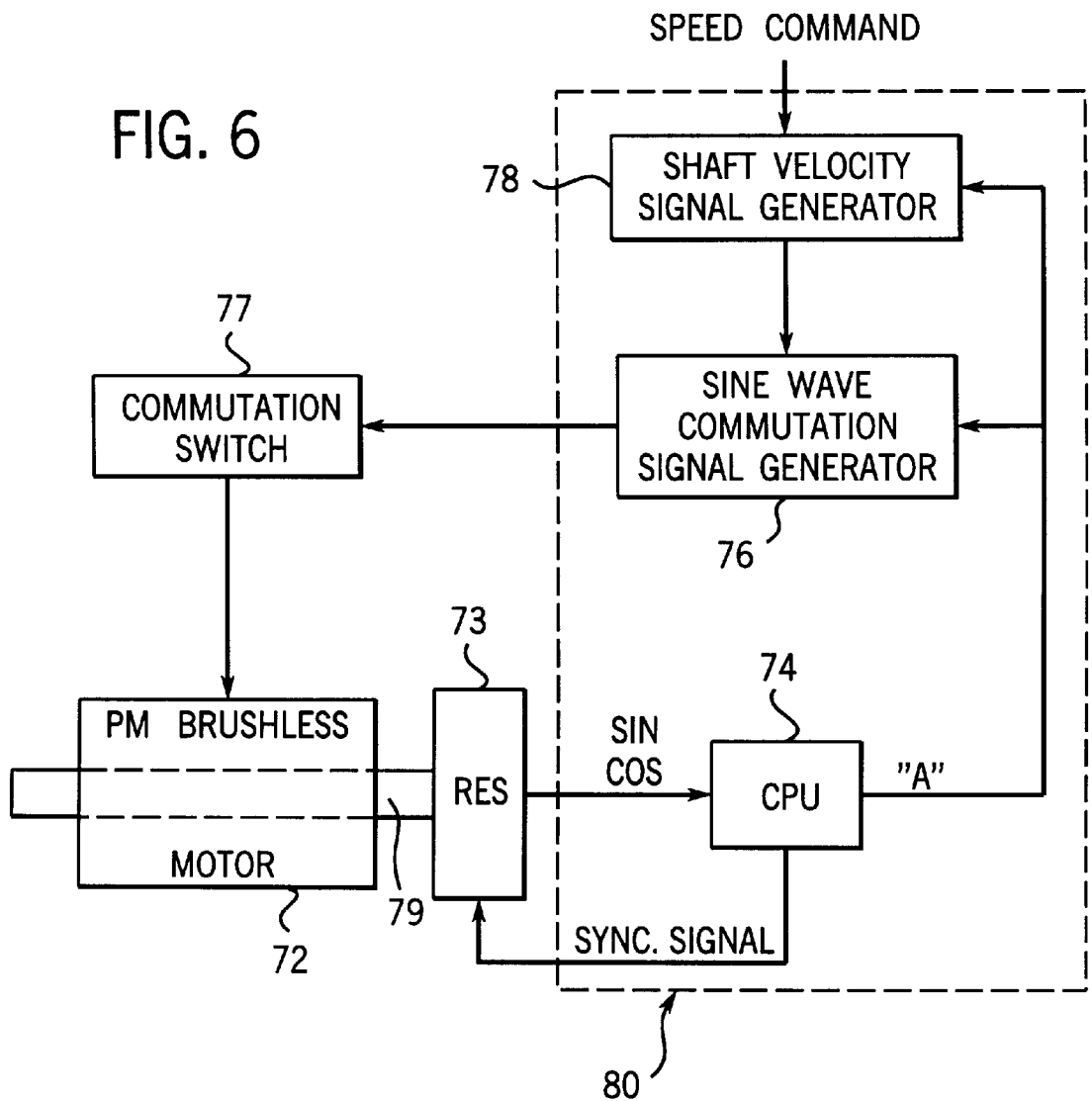
FIG. 6 is a simplified block diagram showing exemplary applications of the invention to motor control.

FIG. 6 shows, in block diagram form, the system of the invention described above in use to provide sine wave commutation for a permanent magnet motor 72, and also control of motor speed. It will be appreciated that the system of this invention can provide these control functions in combination as shown here, or individually as desired, and that other control functions can be performed either in combination or individually. The shaft of the permanent magnet motor 72 is connected to a variable reluctance resolver 73 whose sine and cosine outputs are connected to a DSP processor 74 of the type described above in connection with FIGS. 1–6. The output A of the DSP processor 74, which represents the instantaneous angular position of the motor shaft, is coupled as an input to a suitable prior art angular position-to-sine wave commutation signal generator 76. The output of the signal generator 76 is coupled as an a feedback to a stator winding commutation switch 77, which commutates the power to the stator windings in accordance with sine wave function signals based upon the angular position of the shaft as in prior art sine wave commutation systems. Similarly, the shaft angular position output signal A can be coupled as an input to a suitable prior art shaft rotational speed signal generator 78 (e.g. speed equals the derivative of change in shaft position angle with respect to time) where the feedback signal is compared with a reference, and the error signal is used to control the output of the signal generator 76. The output of the signal generator 78 is coupled to the commutation signal generator 76, which is coupled to the commutation switch 77. Note that in this preferred embodiment, the functions of 74, 76, and 78 are all integrated together in a single motion control DSP integrated circuit chip 80 to minimize system cost.

While the invention has been described in terms of a single preferred embodiment, those skilled in the art will recognize that the invention can be practiced with modifications within the spirit and scope of the appended claims.

Having thus described our invention, what we claim as new and desire to secure by Letters Patent is as follows:

1. A system for determining an angular position of a shaft of a motor, comprising:
    a reluctance resolver coupled to said shaft, said resolver including a sine output winding, a cosine output winding, and an excitation input winding;
    a signal processing system electrically connected to receive signals from said sine output winding and said cosine output winding, respectively;
    a driver under control of said signal processing system for transmitting excitation signals to said excitation input winding;
    wherein said signal processing system synchronizes the receiving of signals from the sine output winding and the cosine output winding, respectively, with the excitation signals transmitted to the excitation winding, so as to sample modulation envelope values of the signals from the sine output winding and the cosine output winding, respectively;
    wherein said signal processing system calculates the angular position of said shaft from said respective modulation envelope values; and
    wherein in calculating said angular position, said signal processing system calculates an estimated position from the sine and cosine signals and applies a correction value to said estimated position from stored error data for said estimated position.

2. A system for determining an angular position of a shaft of a motor, comprising:
    a reluctance resolver coupled to said shaft, said resolver including a sine output winding, a cosine output winding, and an excitation input winding;
    a signal processing system electrically connected to receive signals from said sine output winding and said cosine output winding, respectively;
    a driver under control of said signal processing system for transmitting excitation signals to said excitation input winding;
    wherein said signal processing system synchronizes the receiving of signals from the sine output winding and the cosine output winding, respectively, with the excitation signals transmitted to the excitation winding, so as to sample modulation envelope values of the signals from the sine output winding and the cosine output winding, respectively;
    wherein said signal processing system calculates the angular position of said shaft from said respective modulation envelope values; and
    wherein said motor is a brushless, permanent magnet motor, and wherein said system further includes a commutation switch connected to said motor and a sine wave commutation signal generator for transmitting sine wave commutating signals to said commutation switch.

3. A system for determining an angular position of a shaft of a motor, comprising:
    a reluctance resolver coupled to said shaft, said resolver including a sine output winding, a cosine output winding, and an excitation input winding;
    a signal processing system electrically connected to receive signals from said sine output winding and said cosine output winding, respectively;
    a driver under control of said signal processing system for transmitting excitation signals to said excitation input winding;
    wherein said signal processing system synchronizes the receiving of signals from the sine output winding and the cosine output winding, respectively, with the excitation signals transmitted to the excitation winding, so as to sample modulation envelope values of the signals from the sine output winding and the cosine output winding, respectively;
    wherein said signal processing system calculates the angular position of said shaft from said respective modulation envelope values; and
    wherein said signal processing system includes a shaft velocity signal generator and wherein the signal processing system generates a shaft angular position output signal as one input to said shaft velocity signal generator, and wherein said shaft velocity signal generator is responsive to said shaft angular position output signal and a speed command to produce an error signal and to transmit said error signal to said shaft velocity signal generator.

4. The system of claim 1, 2 or 3, wherein
    said signal processing system includes an analog-to-digital converter for converting analog signals from the sine output winding and the cosine output winding, respectively, to digital values; and
    wherein said signal processing system calculates the angular position from said digital values.

5. The system of claim 4, wherein said signal processing system, including said analog-to-digital converter, is integrated in a single integrated circuit.

6. A method for determining an angular position of a shaft of a motor, comprising:
    generating output signals from a reluctance resolver coupled to said shaft, said resolver including a sine output winding, a cosine output winding, and an excitation input winding, wherein said output signals are generated from said sine output winding and said cosine output winding as respective pulse trains modulated by a sine wave envelope and a cosine wave envelope, respectively,
    transmitting excitation signals to said excitation input winding at a predetermined frequency;
    sampling values from said sine wave envelope and said cosine wave envelope at said predetermined frequency and synchronized to the transmitting of the excitation signals;
    calculating said angular position from the values sampled from the sine wave envelope and the cosine wave envelope; and
    in calculating said angular position, an estimated position is calculated; and
    further comprising the step of applying a correction value to said estimated position from stored error data for said estimated position.

7. A method for determining an angular position of a shaft of a motor, comprising:
    generating output signals from a reluctance resolver coupled to said shaft, said resolver including a sine output winding, a cosine output winding, and an excitation input winding, wherein said output signals are generated from said sine output winding and said cosine output winding as respective pulse trains modulated by a sine wave envelope and a cosine wave envelope, respectively, transmitting excitation signals to said excitation input winding at a predetermined frequency;

sampling values from said sine wave envelope and said cosine wave envelope at said predetermined frequency and synchronized to the transmitting of the excitation signals;

calculating said angular position from the values sampled from the sine wave envelope and the cosine wave envelope; and wherein said motor is a brushless, permanent magnet motor, and further comprising the step of commutating signals to be applied to said motor; and further comprising transmitting sine wave commutating signals to control said commutating signals to be applied to said motor.

8. A method for determining an angular position of a shaft of a motor, comprising:

generating output signals from a reluctance resolver coupled to said shaft, said resolver including a sine output winding, a cosine output winding, and an excitation input winding, wherein said output signals are generated from said sine output winding and said cosine output winding as respective pulse trains modulated by a sine wave envelope and a cosine wave envelope, respectively, transmitting excitation signals to said excitation input winding at a predetermined frequency;

sampling values from said sine wave envelope and said cosine wave envelope at said predetermined frequency and synchronized to the transmitting of the excitation signals;

calculating said angular position from the values sampled from the sine wave envelope and the cosine wave envelope; and further comprising sensing a difference between a commanded velocity and an actual velocity and generating a velocity error signal as an input signal to at least partly control the transmitting of sine wave commutating signals.

9. The method of claim 6, 7 or 8, wherein the calculating step includes converting the values sampled from the sine wave envelope and the cosine wave envelope from analog values to digital values before calculating said angular position.

10. The method of claim 9, wherein the values sampled from the sine wave envelope and cosine wave envelope are converted to digital values and used to calculate angular shaft position in a single integrated circuit.

* * * * *